(12) United States Patent
O'Neill et al.

(10) Patent No.: US 7,427,157 B2
(45) Date of Patent: Sep. 23, 2008

(54) WIND VELOCITY MEASURING APPARATUS

(75) Inventors: Terrence J. O'Neill, Lake Geneva, WI (US); Robin W. Gollnick, Lake Geneva, WI (US)

(73) Assignee: Quartex, Inc., Lake Geneva, WI (US)

( * ) Notice: Subject to any disclaimer, the term of this patent is extended or adjusted under 35 U.S.C. 154(b) by 271 days.

(21) Appl. No.: 11/413,578

(22) Filed: Apr. 28, 2006

(65) Prior Publication Data

US 2006/0193369 A1    Aug. 31, 2006

Related U.S. Application Data

(63) Continuation-in-part of application No. 10/933,894, filed on Sep. 4, 2004, now Pat. No. 7,044,637.

(60) Provisional application No. 60/538,399, filed on Jan. 22, 2004, provisional application No. 60/500,283, filed on Sep. 4, 2003.

(51) Int. Cl.
*G01K 3/04* (2006.01)
*G01K 7/00* (2006.01)
*G01P 5/10* (2006.01)

(52) U.S. Cl. ............... 374/102; 374/2; 374/109; 374/112; 374/170; 374/45; 73/170.11

(58) Field of Classification Search ............ 374/2, 374/120, 121, 126, 134, 129, 161, 162, 109, 374/102, 112, 137, 107
See application file for complete search history.

(56) References Cited

U.S. PATENT DOCUMENTS

| | | | |
|---|---|---|---|
| 3,699,339 A | 10/1972 | Taczak, Jr. | |
| 3,735,136 A | 5/1973 | Flint | |
| 3,954,007 A | 5/1976 | Harrigan | |
| 4,047,431 A | 9/1977 | Mulvaney et al. | |
| 4,091,667 A | 5/1978 | Anderson et al. | |
| 4,106,339 A | 8/1978 | Baer | |
| 4,206,638 A | 6/1980 | Djorup | |
| 4,261,201 A | 4/1981 | Howard | |
| 4,387,301 A | 6/1983 | Wirick et al. | |
| 4,476,373 A | 10/1984 | D'Antonio | |
| 4,504,157 A * | 3/1985 | Crabtree et al. | ............ 374/109 |

(Continued)

FOREIGN PATENT DOCUMENTS

EP    0783097    7/1997

(Continued)

*Primary Examiner*—Gail Verbitsky
(74) *Attorney, Agent, or Firm*—Michael Best & Friedrich LLP

(57) ABSTRACT

A wind velocity measuring apparatus. The apparatus includes a thermal sensor and a processor operatively coupled to the thermal sensor. The processor is configured to receive a first temperature reading from the thermal sensor of a beginning temperature sensed by the thermal sensor and to receive a second temperature reading from the thermal sensor of an ending temperature sensed by the thermal sensor after a quantifiable amount of heat is applied to the thermal sensor for a quantifiable amount of time. The processor is further configured to determine a theoretical temperature based on the quantifiable amount of heat, the quantifiable amount of time, and the beginning temperature and to determine a wind velocity based on the difference between the theoretical temperature and the ending temperature.

10 Claims, 7 Drawing Sheets

U.S. PATENT DOCUMENTS

| | | |
|---|---|---|
| 4,634,292 A | 1/1987 | Ikeda et al. |
| 4,689,483 A | 8/1987 | Weinberger |
| 4,881,823 A | 11/1989 | Tanaka et al. |
| 4,905,513 A | 3/1990 | Burgos |
| 5,183,338 A | 2/1993 | Wickersheim et al. |
| 5,343,744 A | 9/1994 | Ammann |
| 5,520,329 A * | 5/1996 | Clinton et al. ............ 236/68 C |
| 5,641,419 A | 6/1997 | Vandenabeele |
| 5,939,645 A | 8/1999 | Kellerman |
| 5,954,430 A | 9/1999 | Turtiainen et al. |
| 6,064,066 A | 5/2000 | Bevan et al. |
| 6,257,074 B1 | 7/2001 | Kellerman |
| 6,409,198 B1 | 6/2002 | Weimer et al. |
| 6,595,686 B2 | 7/2003 | Rengshausen et al. |
| 6,684,174 B2 | 1/2004 | Clark et al. |
| 6,772,085 B2 | 8/2004 | Watkins et al. |
| 7,044,637 B2 | 5/2006 | O'Neill et al. |
| 2002/0011568 A1 | 1/2002 | Dickmann |
| 2005/0002435 A1 | 1/2005 | Hashimoto et al. |

FOREIGN PATENT DOCUMENTS

| | | |
|---|---|---|
| NL | 1002157 C | 7/1997 |

\* cited by examiner

WIND VELOCITY MEASURING APPARATUS

RELATED APPLICATIONS

The present application is a continuation-in-part patent application of U.S. patent application Ser. No. 10/933,894, filed Sep. 4, 2004, now U.S. Pat. No. 7,044,637 which claims priority to U.S. Provisional Patent Application Ser. No. 60/500,283, filed Sep. 4, 2003, and U.S. Provisional Patent Application Ser. No. 60/538,399, filed Jan. 22, 2004, the entire contents of which are all incorporated herein by reference.

BACKGROUND

Conventional temperature measuring apparatuses or thermometers are often located in an outdoor location, where they are exposed to ambient air, and, in many cases, sunlight. Conventional thermometers are intended to record or display ambient air temperature. In many situations, however, they actually record or display the temperature of their sensing element, which may or may not correspond to the ambient air temperature. For example, when the sensing element is exposed to sunlight, the sensing element may be 20° F. to 30° F. above the ambient temperature. Even when placed in the shade, the sensing element can receive reflected solar radiation or infrared radiation from sunlight-heated surroundings, which can cause the sensing element to experience a temperature a few degrees higher than the ambient air temperature.

Measured temperatures can be combined with other measurements in order to determine additional environmental conditions. For example, a temperature measurement can be combined with a wind velocity measurement in order to determine a wind chill measurement. Wind chill is an attempt to relate a person's or animal's heat loss at a temperature and a specific wind velocity to the same temperature with no wind velocity. Typically, wind chill measurements are only applied to temperatures below 50° F. and winds above 3 miles per hour. Cooling effects of wind, however, continue at temperatures above 50° F., and therefore the term "wind effect" can be used to express both normal wind chill measurements and cooling effects of wind outside of the normal range of wind chill measurements.

Wind effect is determined based on surrounding temperature and wind velocity. There are many different methods of determining wind velocity. For example, a standard method for determining wind velocity uses an anemometer, in which moving air (wind) causes an object (e.g., an impeller) to rotate. Wind velocity is determined based on the speed of rotation of the object. The rotating object, however, experiences inertia, friction, and wear, which can affect the use or accuracy of the anemometer.

Acoustics can also be used to determine wind velocity by measuring the time required for sound waves to travel between two or more points or receivers. Using acoustics, however, requires either the additional cost of multiple receivers or moving parts in order to orientate transducers in the wind.

Another method of determining wind velocity uses air pressure in which an object that is placed perpendicular to moving air has a higher pressure on the side facing the wind and a lower pressure on the side facing away from the wind. The difference in pressures on the sides of the object is used to determine wind velocity. However, similar to the anemometer, the object placed in moving air introduces a moving part that experiences inertia, friction, and wear. In addition, the object must be orientated with respect to the wind in order to accurately calculate wind velocity.

A further method of determining air or wind velocity uses the cooling effect of wind on a heated wire in which the moving air changes the resistance of the heated wire. Wind velocity is calculated based on the change in resistance of the wire. This method requires a constant, sizable, and stable source of power (e.g., 120 volts AC) to heat the wire and, therefore, is not practical for sustained operation with limited sources of power, such as a battery, solar power, etc.

SUMMARY

Embodiments of the invention provide a wind velocity measuring apparatus including a thermal sensor and a processor operatively coupled to the thermal sensor. The processor is configured to receive a first temperature reading from the thermal sensor of a beginning temperature sensed by the thermal sensor and to receive a second temperature reading from the thermal sensor of an ending temperature sensed by the thermal sensor after a quantifiable amount of heat is applied to the thermal sensor for a quantifiable amount of time. The processor is further configured to determine a theoretical temperature based on the quantifiable amount of heat, the quantifiable amount of time, and the beginning temperature and to determine a wind velocity based on the difference between the theoretical temperature and the ending temperature.

Additional embodiments provide a method of determining wind velocity including receiving a first temperature reading from a thermal sensor of a beginning temperature sensed by the thermal sensor; receiving a second temperature reading from the thermal sensor of an ending temperature sensed by the thermal sensor after a quantifiable amount of heat is applied to the thermal sensor for a quantifiable amount of time; determining a theoretical temperature based on the quantifiable amount of heat, the quantifiable amount of time, and the beginning temperature; and determining a wind velocity based on the difference between the theoretical temperature and the ending temperature.

Another embodiment provides a wind velocity measuring apparatus including a processor, a first thermal sensor operatively coupled to the processor and having a first thermal absorbency, and a second thermal sensor operatively coupled to the processor and having a second thermal absorbency lower than the first thermal absorbency. The processor is configured to receive a first temperature reading from the first thermal sensor of a first beginning temperature sensed by the first thermal sensor, a second temperature reading from the first thermal sensor of a first ending temperature sensed by the first thermal sensor after a quantifiable amount of heat is applied to the first thermal sensor for a quantifiable amount of time, a third temperature reading from the second thermal sensor of a second beginning temperature sensed by the second thermal sensor, and a fourth temperature reading sensed by the second thermal sensor of a second ending temperature sensed by the second thermal sensor after the quantifiable amount of heat is applied to the second thermal sensor for the quantifiable amount of time. The processor is further configured to determine a theoretical temperature based on the quantifiable amount of heat, the quantifiable amount of time, and at least one of the first beginning temperature and the second beginning temperature and to determine a wind velocity based on the difference between the theoretical temperature and at least one of the first ending temperature and the second ending temperature.

DETAILED DESCRIPTION

Figure 1:
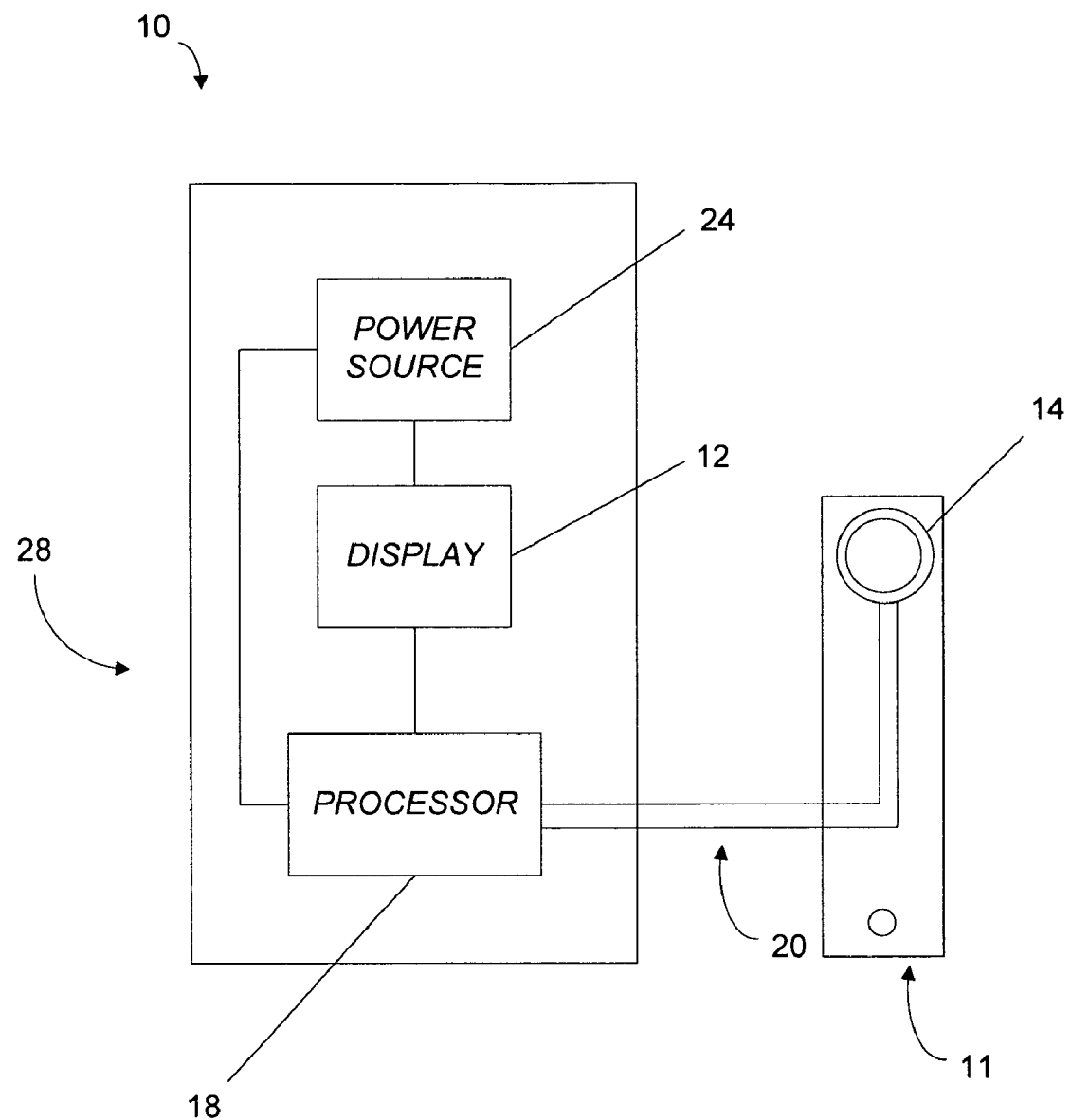
FIG. 1 is a schematic view of the structure of a wind velocity measuring apparatus according to one embodiment of the invention.

Referring to FIG. 1, a wind velocity measuring apparatus 10 according to one embodiment of the present invention includes a processor portion 28 linked to a thermal sensor portion 11. In the embodiment shown in FIG. 1, the link between the processor portion 28 and the sensor portion 11 includes an electrical connection made by connection wires 20. However, as will be readily apparent to those of skill in the art, the link between the processor portion 28 and the sensor portion 11 could include a connection other than a hard-wired connection. For example, the processor portion 28 could be linked to the sensor portion 11 through a radio frequency, infrared, or other non-wired connection.

The sensor portion 11 of the wind velocity measuring apparatus 10 includes a first thermal sensor 14 that senses temperature information in the environment in which the sensor portion 11 sits. The temperature information sensed by the sensor 14 is transmitted to a processor 18 within the processor portion 28. The processor portion 28 can also include a power source 24. The power source 24 can include AC current, a solar panel, a battery, or other sources of power.

In some embodiments, the processor portion 28 also includes a display 12. The power source 24 can supply power to the processor 18 and/or the display 12. The processor 18 uses the temperature information received from the sensor 14 to determine (as will be discussed below) a temperature reading and one or more other environmental readings (e.g., wind effect) that can then be displayed on the display 12 of the processor portion 28. The display 12 can include a digital display. However, it will be readily apparent to those of skill in the art that the display 12 could include types of displays other than a digital display and could display any of a number of readings (including non-temperature readings) according to the calculations or determinations of the processor 18, as discussed below.

The sensor portion 11 is placed in an environment generally free from obstructions such that a flow of wind, if present in the environment, is fully experienced by the sensor portion 11.

The first thermal sensor 14 provides temperature readings of the environment in which the sensor portion 11 sits, and the processor 18 is configured to use the temperature readings to determine a wind velocity and other environmental measurements (e.g., a temperature and a wind effect). The processor 18 can be configured to display the wind velocity and the other environmental measurements on the display 12.

The processor 18 determines a wind velocity experienced by the first thermal sensor 14 by comparing a temperature sensed by the first thermal sensor 14 after a quantifiable amount of heat is applied to the first thermal sensor 14 to a theoretical temperature determined by the processor 18.

For example, as described in detail below, the processor 18 can apply a voltage (or other means of heating) to the sensor 14 (or a heating element close to the sensor 14) for a short period, which raises the temperature sensed by the sensor 14. After applying the heating pulse, the processor 18 records the temperature sensed by the sensor 14. Based on the temperature sensed by the sensor 14 before the heating pulse was applied and the heat that was applied to the sensor 14, the processor 18 determines a theoretical still air heated temperature that the sensor 14 would have experienced if the sensor 14 were placed in still air. This determination can be based on previously measured data modeled as an algorithm or stored in a look up table in the processor 18. The previously measured data can be customized for the particular sensor used in the apparatus 10. For example, the data can be customized based on the sensor's mass, thermal conduction, surface area, surface texture, and/or thermal convection (e.g., in still air).

Based on the temperature difference between the determined still air heated temperature and the actual heated air temperature sensed by the sensor 14, the processor 18 determines the corresponding wind speed or velocity causing the difference between the two temperatures (e.g., based on previously measured data modeled as an algorithm or stored in a look up table in the processor 18).

As described below, in some embodiments, the processor 18 uses solar radiation as a heat source for heating the sensor 14, and the apparatus 10 includes a photosensitive sensor 17 operable to measure the amount of solar radiated heat being absorbed by the thermal sensor 14.

Figure 2:
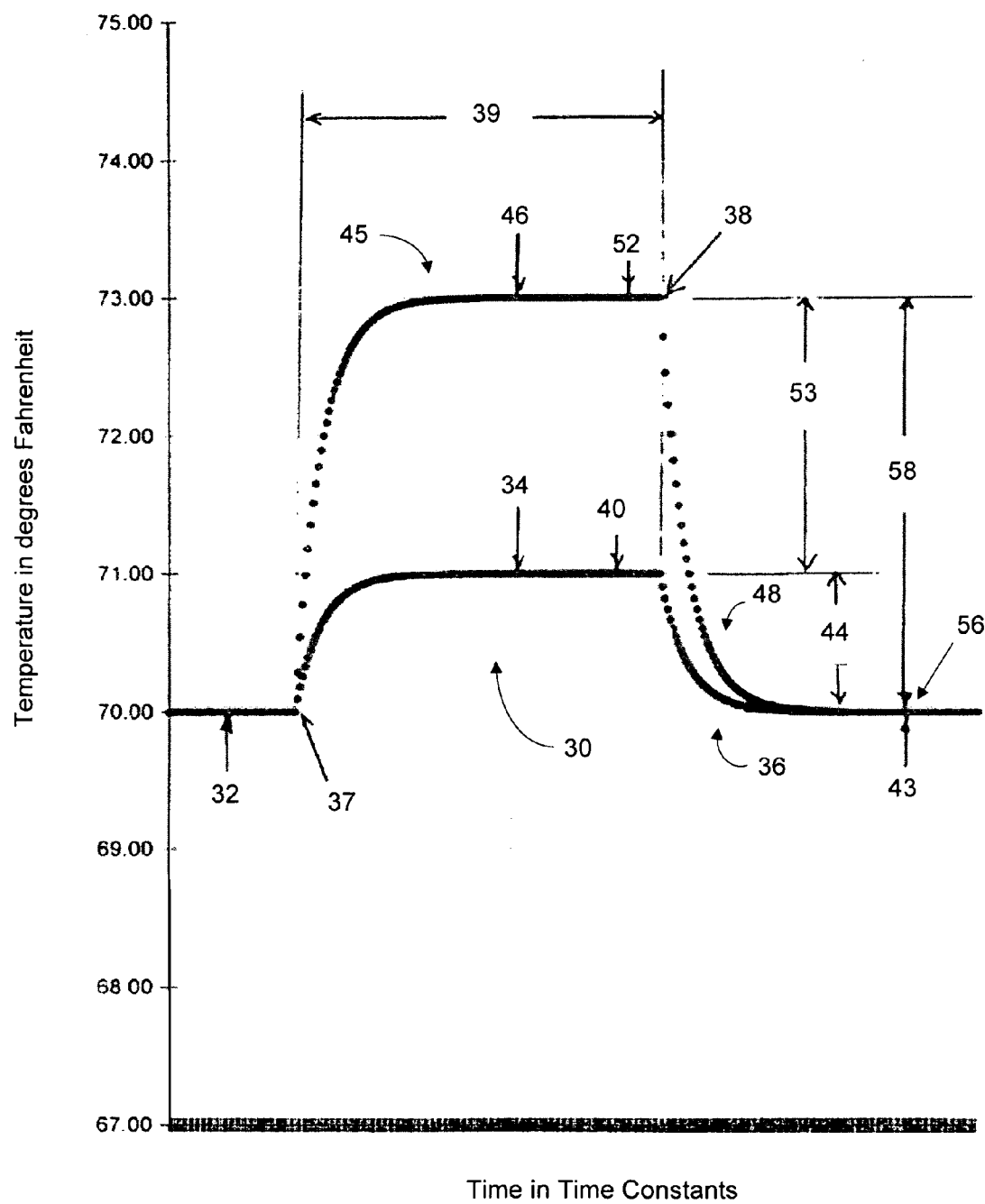
FIG. 2 illustrates exemplary temperature responses of a sensor of the wind velocity measuring apparatus of FIG. 1 in a still air environment and in a wind environment according to one embodiment of the invention.

FIG. 2 illustrates temperature responses of the sensor 14 in a still air environment (line 46) and in a wind environment (line 34) when a quantifiable amount of heat is applied to the sensor 14 for a predetermined amount of time (duration 39). The processor 18 determines a difference in temperature (difference 53) between the temperature response of the sensor 14 in the still air environment (line 46) and the temperature response of the sensor 14 in the wind environment (line 34). The processor 18 uses the difference in temperature to determine the velocity of wind experienced by the sensor 14.

As shown in FIG. 2, line 30 represents temperature readings sensed by the first thermal sensor 14 over a period of time. Line 30 includes a first line 32, the line 34, and a third line 36. The first line 32 represents one or more temperature readings sensed by the first thermal sensor 14 before a quantifiable amount of heat is applied to the thermal sensor 14 (hereinafter collectively referred to as a "beginning temperature"). The line 34 represents one or more temperature readings sensed by the first thermal sensor 14 when the quantifiable amount of heat is applied to the first thermal sensor 14, and the third line 36 represents one or more temperature readings sensed by the first thermal sensor 14 after the quantifiable amount of heat has been applied to the sensor 14 (hereinafter collectively referred to as an "ending temperature"). As indicated, the quantifiable amount of heat is applied to the sensor 14 for a quantifiable amount of time, represented by duration 39, from a time 37 to a time 38. In some embodiments, the quantifiable amount of time ranges from approximately 10 seconds to 60 seconds.

As shown in FIG. 2, the quantifiable amount of heat applied to the first thermal sensor 14 causes the temperature readings sensed by the first thermal sensor 14 to rise and reach a peak rising temperature 40. After the quantifiable amount of heat is no longer applied to the first thermal sensor 14, the temperature readings sensed by the first thermal sensor 14 drop and reach an end cooling temperature 43. The actual temperature rise sensed by the thermal sensor 14 (i.e., the difference between the peak rising temperature 40 and the end cooling temperature 43) is shown in FIG. 2 as difference 44.

Line 45 illustrated in FIG. 2 represents "theoretical" temperature readings determined by the processor 18. The theoretical temperature readings represent determined temperatures that would be sensed by the first thermal sensor 14 if the first thermal sensor 14 were placed in a still air environment. Line 45 includes the line 46 and a second line 48. The line 46 includes theoretical temperature readings sensed by the sensor 14 while the quantifiable amount of heat is applied to the sensor 14, and the second line 48 includes theoretical temperature readings sensed by the sensor 14 after the quantifiable amount of heat is no longer applied to the sensor 14.

As shown in FIG. 2, the theoretical temperature readings included in the line 46 rise and reach a theoretical peak rising temperature 52. The difference 53, as shown in FIG. 2, represents the difference between the theoretical peak rising temperature 52 and the actual peak rising temperature 40.

Similarly, after the quantifiable amount of heat is no longer applied to the thermal sensor 14, the theoretical temperature readings drop to a theoretical end cooling temperature 56. The theoretical temperature rise determined by the processor 18 (i.e., the difference between the theoretical peak rising temperature 52 and the theoretical end cooling temperature 56) is shown in FIG. 2 as difference 58.

The theoretical rate of thermal change of the sensor 14 due to the application of the quantifiable amount of heat and the ceasing of application of the quantifiable amount is heat is determined based on the following natural log equation.

$$(AT)=(IT)+((FT-IT) \times (1-(1/(e^{(t/tc)}))))$$

The variable "AT" in the above equation represents the actual temperature sensed by the first thermal sensor 14 after the quantifiable amount of heat is applied to the sensor 14. The variable "IT" represents the actual initial or beginning temperature sensed by the thermal sensor 14 before the heat is applied, and the variable "FT" represents the theoretical final or ending temperature sensed by the sensor 14 after the heat is applied. The variable "t" represents the quantifiable amount of time that the heat is applied, and the variable "tc" represents the thermal time constant of the sensor 14.

Figure 3:
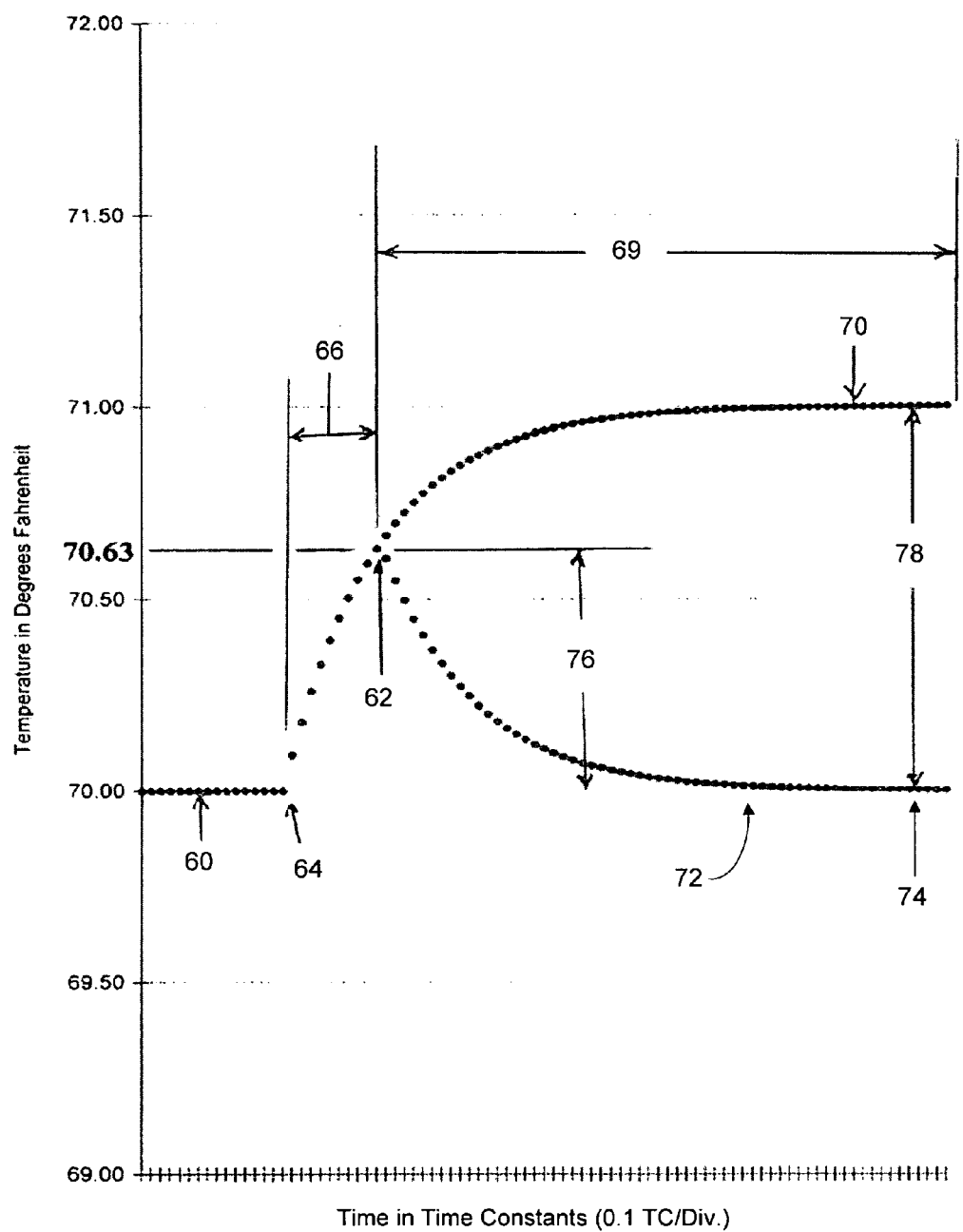
FIG. 3 illustrates exemplary temperature responses of a sensor of the wind velocity measuring apparatus of FIG. 1 due to the application of a heating pulse to the sensor according to one embodiment of the invention.

FIG. 3 illustrates temperature readings sensed by the thermal sensor 14, when the thermal sensor 14 has a thermal time constant of one (i.e., the temperature sensed by the thermal sensor 14 increases approximately 63% of the temperature difference between its present reading and the final reading 70 for each time constant that a quantifiable amount of heat is applied to the sensor 14 by a heat source). As shown, the temperature 60 sensed by the thermal sensor 14 before the heat is applied (i.e., beginning temperature 60) is 70° F., and the actual temperature sensed by the thermal sensor 14 after the heat is applied for one time constant (i.e., the ending temperature 62) is 70.63° F. The heat is applied at time 64 for duration 66 (e.g., one time constant).

As shown in FIG. 3, the line starting at temperature 60, rising to temperatures 64 and 62, and dropping to temperatures 72 and 74 represents the actual temperature readings sensed by the thermal sensor 14 before, during, and after the heat application. As shown in FIG. 3, the actual temperature readings sensed by the thermal sensor 14 peak at temperature 62 at the end of the heat application and drop after the heat is no longer applied to the sensor 14. The actual temperature drop sensed by the thermal sensor 14 reaches an end cooling temperature 74. The end cooling temperature 74 is generally equal to the beginning temperature 60. If the end cooling temperature 74 is not generally equal to the beginning temperature 60, the ambient temperature experienced by the sensor 14 has changed and the processor 18 can repeat the heating process or compensate for the temperature change when determining a wind velocity experienced by the apparatus 10. Therefore, the actual temperature rise experienced by the thermal sensor is illustrated in FIG. 3 as difference 76.

If heat was continued to be applied to the sensor 14 during duration 69 (e.g., by applying a 5 time constant heat pulse), the sensor's temperature would have continued to rise as shown by line 70 in FIG. 3 to a temperature of 71° F. The processor 18 can determine this theoretical final temperature, using the equation $(AT)=(IT)+((FT-IT) \times (1-(1/(e(t/c)))))$ and the actual temperature rise experienced by the thermal sensor.

$$AT = (IT) + ((FT-IT) \times (1-(1(e^{(t/tc)}))))$$

$$70.63°\ F. = (70°\ F.) + ((FT-70°\ F.) \times (1-(1/(e^{1/1}))))$$

$$70.63°\ F. = (70°\ F.) + ((FT-70°\ F.) \times (1-(1/(e^{(1)}))))$$

$$70.63°\ F. = (70°\ F.) + ((FT-70°\ F.) \times (1-(1/(2.72))))$$

$$70.63°\ F. = (70°\ F.) + ((FT-70°\ F.) \times (1-(0.368)))$$

$$70.63°\ F. = (70°\ F.) + ((FT-70°\ F.) \times (0.632))$$

$$70.63°\ F. = (70°\ F.) + (0.632 \times FT) - (0.632 \times 70°\ F.)$$

$$70.63°\ F. = (70°\ F.) + (0.632 \times FT) - 44.24°\ F.$$

$$70.63°\ F. = (0.632 \times FT) + 25.76°\ F.$$

$$44.87°\ F. = (0.632 \times FT)$$

$$71°\ F. = FT$$

Using the above calculation, the processor 18 can determine the theoretical final temperature of the sensor 14 that would be experienced by the sensor if a heating pulse was applied to the sensor 14 during the entire heating duration 39 even though a shorter heating pulse is applied to the sensor 14. Using a shorter heating pulse can reduce the current consumption required by the power source 24. For example, if the power source 24 includes a battery, using a shorter heating pulse can extend the life of the battery. Furthermore, using a shorter heating pulse can permit the processor 18 to apply various lengths of heating pulses to the sensor 14.

The difference between the determined final temperature "FT" and the actual ending temperature sensed by the sensor 14 is the result of the cooling rate of wind or air affecting the sensor 14. In some embodiments, the relationship between the cooling rate of wind and the difference between the determined final temperature "FT" and the actual ending temperature sensed by the sensor 14 can be experimentally established for the sensor 14. For example, the rate of cooling of an object follows the following equation:

$$dT/dt = K*(A-T)$$

where "K" is a constant, "A" is the air temperature surrounding the object, and "T" is the temperature of the object.

As the air around the sensor 14 absorbs the heat, the sensor 14 becomes warmer, which decreases the difference between "A" & "T," which in turn decreases the cooling rate. As the wind starts to blow and moves across the sensor 14, the wind moves the warmer air surrounding the sensor 14 away from the sensor 14, which increases the difference in temperature between "A" & "T" and increases the cooling rate. Therefore, the wind speed, which determines the rate at which the warmer air is removed from around the sensor 14, also affects the air temperature surrounding the object and the cooling rate of the sensor 14. Although not described in detail herein, the above equation may be applied to heating as well as cooling rates.

Once the relationship between the cooling effect of the moving air on the heated sensor 14 and the corresponding velocity of the moving air is established for a particular application, the processor 18 can determine the velocity of the moving air (e.g., an average wind velocity) from the temperature difference. It should be understood that, not only can the processor 18 compare the ending temperature to the determined final temperature, but the processor 18 can also compare temperatures sensed by the sensor 14 during and after the heat application to determine intermediary theoretical temperatures in order to determine the wind velocity at particular times.

The "no wind" or determined theoretical final temperature values can be factory-stored values, determined by the processor 18 from a factory-stored equation, or determined at time of installation, or the apparatus 10 can be self-calibrating during use.

In some embodiments of the invention, a heating source applies a voltage pulse directly to a thermal sensor 14 or to a heating element close to the sensor 14 to heat the sensor 14. A capacitor could also be charged and discharged into the sensor 14 in order to apply the heating pulse.

As noted above, applying a shorter heating pulse to the sensor 14 in order to determine wind speed reduces current draw and enables the sensor 14 to more rapidly return to ambient temperature conditions for measuring ambient temperatures. A shorter heating pulse also requires less current from the power source 24 and can increase the life of the power source 24.

The processor 18 can also use differences between an actual cooling rate experienced by the first thermal sensor 14 and a theoretical cooling rate of the first thermal sensor 14 in order to determine a wind velocity experienced by the sensor 14 using similar versions of the above equation.

After the processor 10 determines a wind velocity experienced by the sensor 14, the processor 10 can also determine a wind chill or effect. For example, the processor 18 can store a table or an equation that relates wind velocity and temperature to wind effect. The processor 18 can display a determined wind effect on the display 12. The processor 18 can also display a temperature, wind velocity, or other environmental measurements on the display 12.

Figure 4:
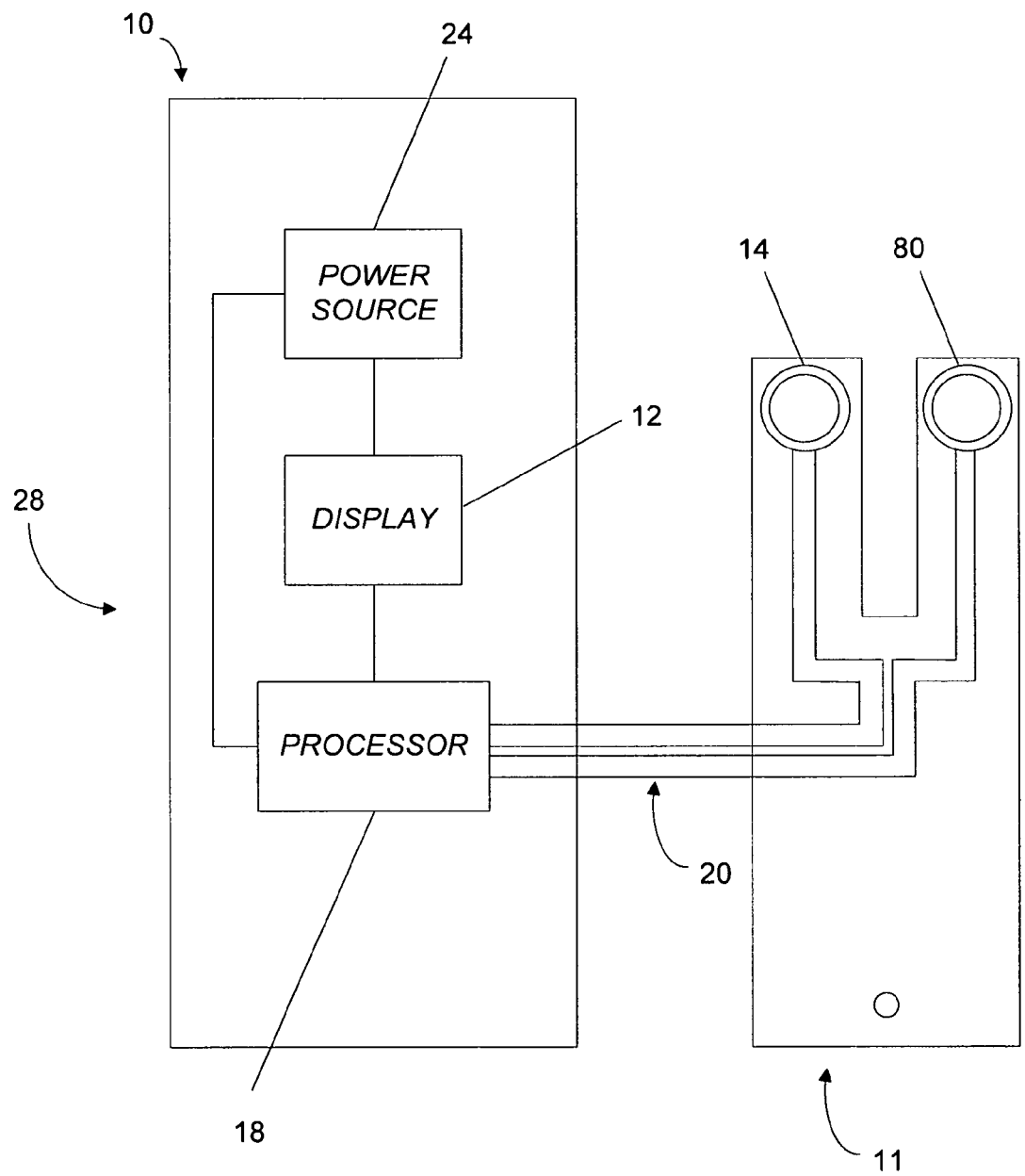
FIG. 4 is a schematic view of the structure of a wind velocity measuring apparatus including a photosensitive sensor according to one embodiment of the invention.

In some embodiments, an external heat source can be used to apply the quantifiable amount of heat to the first thermal sensor 14 of the wind velocity measuring apparatus 10. For example, heat generated by solar radiation (sunlight) striking the apparatus 10 can be used as an external heat source. To use an external heat source, such as solar radiation, the apparatus 10, as shown in FIG. 4, includes a photosensitive sensor 80. The photosensitive sensor 80 is calibrated (e.g., by an optic filter or other means) to measure the amount of solar radiation being absorbed by the first thermal sensor 14. The radiation or heat information read by the photosensitive sensor 80 is transmitted to the processor 18. The processor 18 uses the solar radiation or heat measurement information received from the photosensitive sensor 80 to determine a quantifiable amount of heat being applied to the first thermal sensor 14 over a quantifiable amount of time. Using the quantifiable amount of heat, the processor 18 determines a theoretical final temperature reading as described above in order to determine the velocity of wind experienced by the first thermal sensor 14.

In some embodiments, using an external heat source to heat the sensor 14 is especially useful for particular environments, such as shady environments or environments that experience periods of darkness or shade. The shade or darkness provides a reference temperature for the processor 18 of the temperature sensed by the sensor 14 before being heated by the solar radiation.

Functionality of the apparatus 10 can also be combined with embodiments of the temperature measuring apparatus described in U.S. patent application Ser. No. 10/933,894, filed Sep. 4, 2004, which is incorporated herein by reference. The temperature measuring apparatus described in the above-identified patent application discloses a temperature measuring apparatus that includes at least two thermal sensors that have different thermal absorbencies. Because of their different absorbencies, the sensors provide different temperature readings depending on the environmental conditions in which the sensors are placed. For example, the sensors can provide different temperature readings based on whether the sensors are placed in sunlight or in shade. A processor coupled to the sensors uses the temperature readings to determine various environmental conditions, such as ambient air temperature. Functionality of the above-described wind velocity measuring apparatus 10, therefore, can be combined with functionality of the temperature measuring apparatus described in the above-identified patent application in order to provide an apparatus capable of calculating wind velocity and, accordingly, wind effect for both sunlight and shade conditions.

Figure 5:
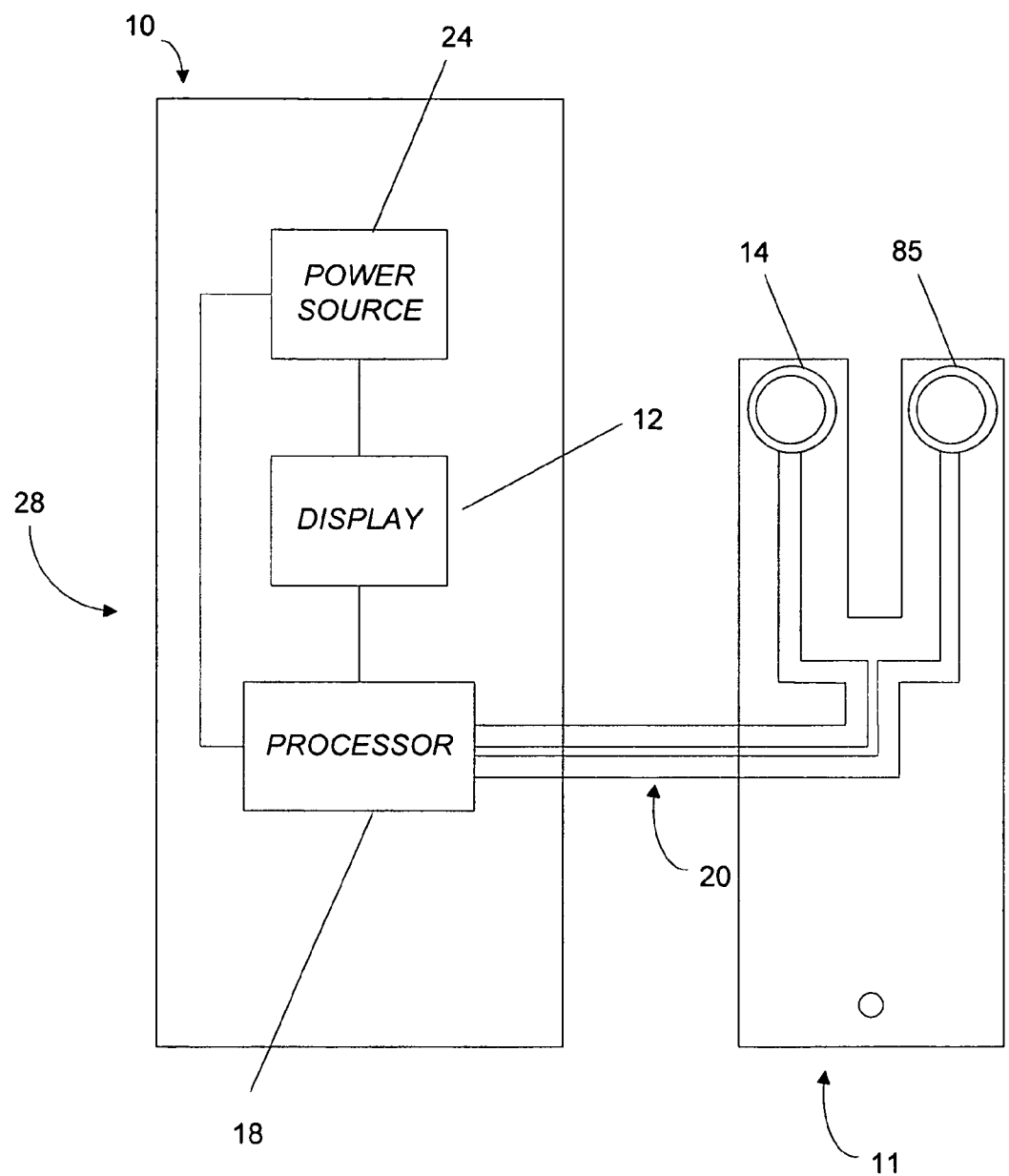
FIG. 5 is a schematic view of the structure of a wind velocity measuring apparatus including two thermal sensors with different thermal absorbencies according to one embodiment of the invention.

For example, as shown in FIG. 5, the wind velocity measuring apparatus 10 can include the first thermal sensor 14 and a second thermal sensor 85. The first thermal sensor 14 (e.g., the "white" sensor) has a thermal absorbency that is different (e.g., lower) than the thermal absorbency of the second thermal sensor 85 (e.g., the "black" sensor). The processor 18 receives temperature readings from the two thermal sensors 14 and 85 and, using the method described in U.S. patent application Ser. No. 10/933,894 or other suitable methods, determines the ambient air temperature. As described above, to determine wind velocity, the processor 18 can apply a heating pulse to at least one of the first thermal sensor 14 and the second thermal sensor 85 or, as described below, use solar heat experienced by at least one of the first thermal sensor 14 and the second thermal sensor 85 to determine a theoretical final still air temperature that the heated sensor would have sensed if the sensor was in still air. Based on the temperature difference between the actual temperature sensed by the heated sensor and the theoretical final temperature of the sensor determined by the processor 18, the processor 18 can determine the wind speed causing the difference between the temperatures.

In some embodiments, the apparatus 10 illustrated in FIG. 5 can use the determined ambient temperature and wind velocity to provide an environment condition measurement, such as sunny and windy, partly cloudy, windy and partly cloudy, sunny, and sunlight intensity (e.g., percentage or amount of sunlight being received).

Figure 6:
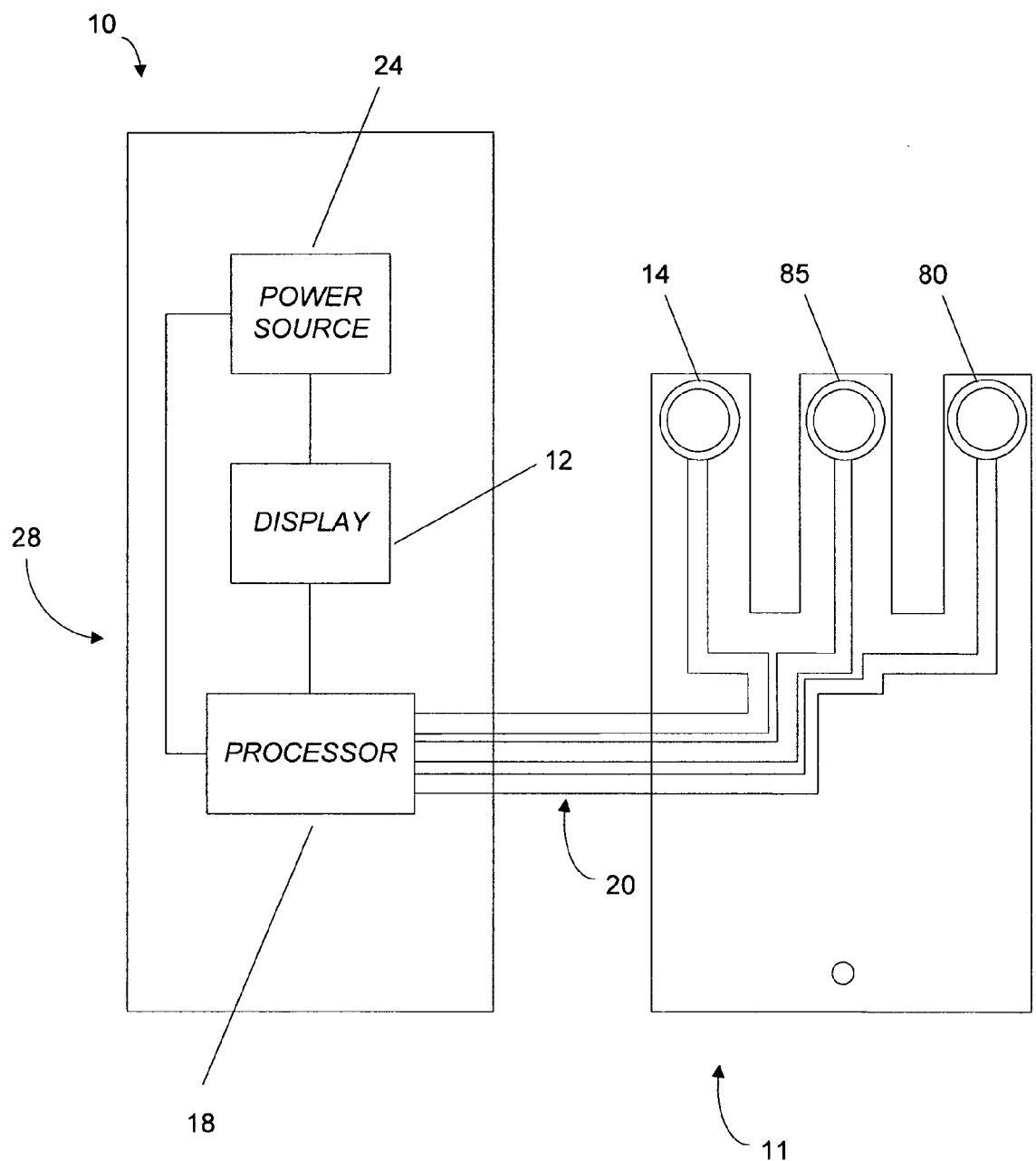
FIG. 6 is a schematic view of the structure of a wind velocity measuring apparatus including a photosensitive sensor and two thermal sensors with different thermal absorbencies according to one embodiment of the invention.

As described above with respect to FIG. 4, an external heat source, such as solar radiation generated by sunlight, can be used to apply a quantifiable amount of heat to a thermal sensor of the wind velocity measuring apparatus 10. It should be understood that an external heat source can also be used to apply a quantifiable amount of heat to multiple thermal sensors, when the apparatus 10 is combined with functionality of the temperature measuring apparatus as shown in FIG. 5. In particular, as shown in FIG. 6, this can be accomplished by adding a photosensitive sensor 80 that measures the amount of sunlight that is falling on the two thermal sensors 14 and 85 to the apparatus 10 illustrated in FIG. 5. The processor 18 uses a quantifiable amount of heat measured by the photosensitive sensor 80 to determine theoretical temperature readings of at least one of the two thermal sensors 14 and 85. The processor 18 then uses the difference in temperature readings of at least one of the two thermal sensors 14 and 85 (e.g., the "black sensor" or the thermal sensor with the higher thermal absorbency) and the theoretical temperature readings to determine wind velocity.

Figure 7:
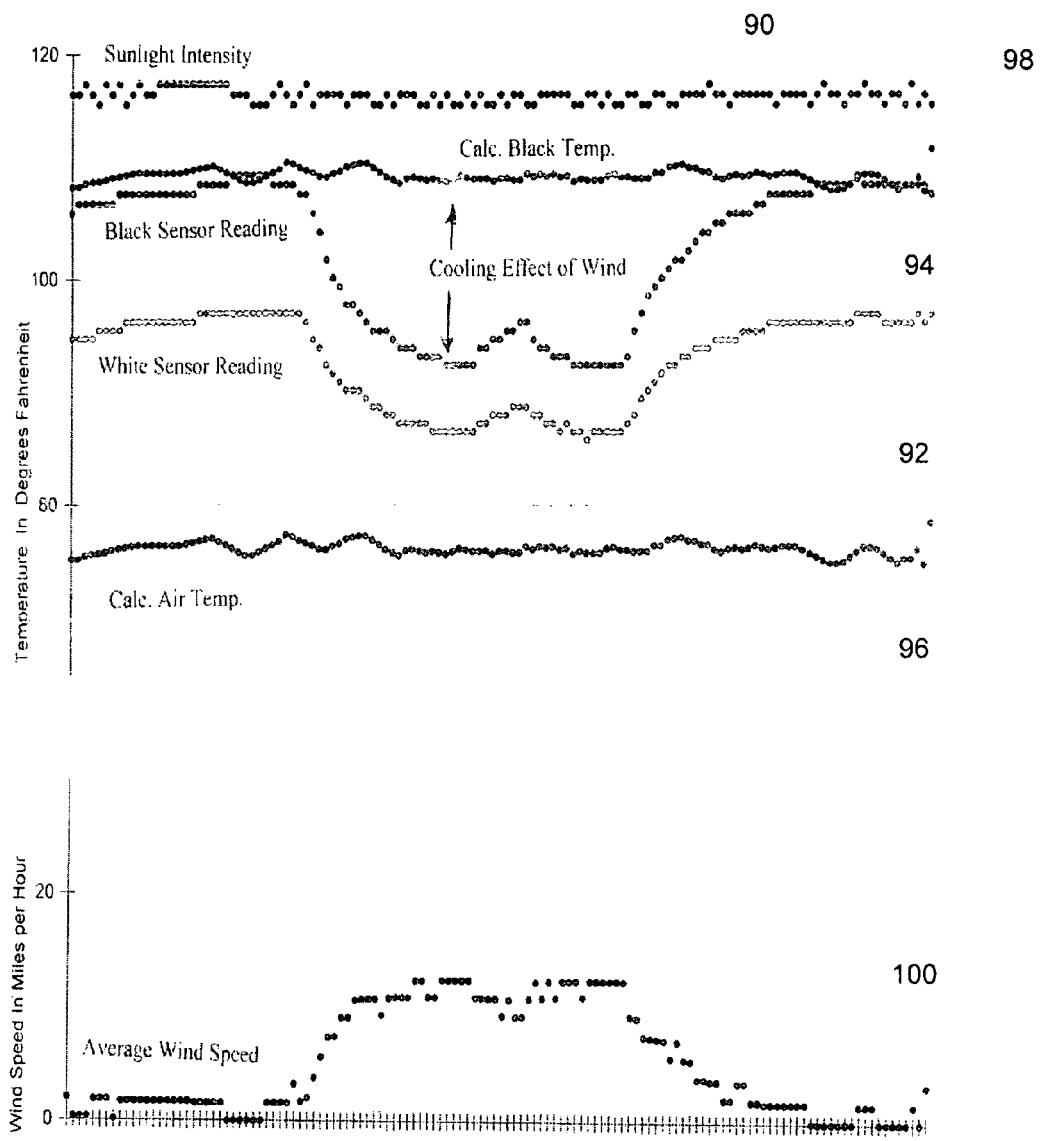
FIG. 7 is a graphical representation illustrating temperature responses of sensors of the wind velocity measuring apparatus of FIG. 6 according to one embodiment of the invention.

FIG. 7 is a graphical representation illustrating exemplary temperature information measured by the wind velocity measuring apparatus 10 illustrated in FIG. 6 that includes the first thermal sensor 14 and the second thermal sensor 85 that each have different thermal absorbencies (e.g., a "white sensor" that has a first thermal absorbency and a "black sensor" that has a second thermal absorbency that is higher than the first thermal absorbency) and the photosensitive sensor 80. As shown, data points 90 represent sunlight intensity or solar radiation measurements measured by the photosensitive sensor 80. Data points 92 represent temperature readings sensed by the first thermal sensor 14 (e.g., the "white sensor"), and data points 94 represent temperature readings sensed by the second thermal sensor 85 (e.g., the "black sensor"). As shown in FIG. 7, using the data points 92 and 94, the processor 18 determines ambient air temperature, represented by data points 96, using the methodology described in the above-identified patent application. The processor 18 also uses the sunlight intensity measurements and the temperature readings sensed by the second thermal sensor 85 to determine theoretical temperature readings for the second thermal sensor 85 (e.g., the "black sensor"), represented by data points 98. Using the theoretical temperature readings (data points 98) and the actual temperature readings sensed by the second thermal sensor 85 (data points 94), the processor 18 determines wind velocity, as represented by data points 100. As noted above, the processor 18 can use a table or equation to determine wind chill or wind effect based on the determined wind velocity and temperature.

In some embodiments, the relationship between the amount of sunlight falling on the thermal sensors and the resulting increase in temperature of the thermal sensors varies based on changes in the sensors' absorption surfaces and/or the environment surrounding the sensors. As a result, periodic recalibration of that relationship may need to be performed. The recalibration can be performed by using the above-described thermal rate of change method to determine the wind velocity and then adjusting the relationship between the amount of sunlight and the expected increase in temperature of the sensors. In some embodiments, only one sensor needs to be calibrated, because the ratio of the thermal rise of the two thermal sensors due to absorbed sunlight (the "K" factor) is part of the method to determine the ambient temperature.

Various features of embodiments of the invention are set forth in the following claims.

The invention claimed is:

1. A wind velocity measuring apparatus comprising:
a processor;
a first thermal sensor operatively coupled to the processor and having a first thermal absorbency; and
a second thermal sensor operatively coupled to the processor and having a second thermal absorbency lower than the first thermal absorbency,
wherein the processor is configured to receive from at least one of the first thermal sensor and the second thermal sensor a first temperature reading and a second temperature reading sensed by the at least one of the first thermal sensor and the second thermal sensor after a quantifiable amount of heat is applied to the at least one of the first thermal sensor and the second thermal sensor for a quantifiable amount of time, and
wherein the processor is further configured to determine a theoretical temperature based on the quantifiable amount of heat, the quantifiable amount of time, the first temperature reading, and the second temperature reading and to determine a wind velocity based on the difference between the theoretical temperature and the second temperature reading.

2. The wind velocity measuring apparatus of claim 1 further comprising a heat-producing component operatively coupled to the processor.

3. The wind velocity measuring apparatus of claim 2 wherein the processor is further operative to controllably apply the quantifiable amount of heat to the at least one of the first thermal sensor and the second thermal sensor using the heat-producing component for the quantifiable amount of time.

4. The wind velocity measuring apparatus of claim 3 wherein the heat-producing component includes a battery.

5. The wind velocity measuring apparatus of claim 1 further comprising a photosensitive sensor operatively coupled to the processor and operative to sense the quantifiable amount of heat applied to the at least one of the first thermal sensor and the second thermal sensor.

6. The wind velocity measuring apparatus of claim 5 wherein the processor is further configured to receive a heat reading from the photosensitive sensor of the quantifiable amount of heat applied to the at least one of the first thermal sensor and the second thermal sensor.

7. The wind velocity measuring apparatus of claim 1 wherein the processor is further operative to determine an ambient temperature based on a difference between temperature readings received from the first thermal sensor and temperature readings received from the second thermal sensor and a rate of change of temperature readings received from the at least one of the first thermal sensor and the second thermal sensor resulting from the quantifiable amount of heat being applied to the at least one of the first thermal sensor and the second thermal sensor.

8. The wind velocity measuring apparatus of claim 7 wherein the processor is further operative to determine a wind effect based on the wind velocity and the ambient temperature.

9. The wind velocity measuring apparatus of claim 8 wherein the wind effect is a wind chill.

10. The wind velocity measuring apparatus of claim 1 further comprising a display operatively coupled to the processor and operative to display at least one of a temperature, a wind effect, and the wind velocity.

* * * * *

UNITED STATES PATENT AND TRADEMARK OFFICE
CERTIFICATE OF CORRECTION

PATENT NO. : 7,427,157 B2 Page 1 of 1
APPLICATION NO. : 11/413578
DATED : September 23, 2008
INVENTOR(S) : Terrence J. O'Neill and Robin W. Gollnick It is certified that error appears in the above-identified patent and that said Letters Patent is hereby corrected as shown below:

The Assignee information on the face of the patent should read as follows:

Quartex, A Division of Primex, Inc., Lake Geneva, WI (US)

Signed and Sealed this

Eleventh Day of November, 2008

JON W. DUDAS
*Director of the United States Patent and Trademark Office*